United States Patent
Yiu et al.

(10) Patent No.: US 10,785,828 B2
(45) Date of Patent: Sep. 22, 2020

(54) 60GHZ-LWA SUPPORT: DISCOVERY AND KEEP ALIVE

(71) Applicant: Intel IP Corporation, Santa Clara, CA (US)

(72) Inventors: Candy Yiu, Portland, OR (US); Nageen Himayat, Fremont, CA (US); Ofer Hareuveni, Haifa (IL); Jerome Parron, Fuerth (DE); Penny Efraim-Sagi, Kfar Sava (IL); Shadi Iskander, Unterhaching (DE); Alexander Sirotkin, Petach Tikva (IL); Umesh Phuyal, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 10 days.

(21) Appl. No.: 16/083,264

(22) PCT Filed: Feb. 20, 2017

(86) PCT No.: PCT/US2017/018580
§ 371 (c)(1),
(2) Date: Sep. 7, 2018

(87) PCT Pub. No.: WO2017/176376
PCT Pub. Date: Oct. 12, 2017

(65) Prior Publication Data
US 2019/0029073 A1    Jan. 24, 2019

Related U.S. Application Data

(60) Provisional application No. 62/320,249, filed on Apr. 8, 2016.

(51) Int. Cl.
*H04W 36/00* (2009.01)
*H04W 36/30* (2009.01)
(Continued)

(52) U.S. Cl.
CPC .......... *H04W 88/10* (2013.01); *H04B 7/0617* (2013.01); *H04B 17/318* (2015.01);
(Continued)

(58) Field of Classification Search
CPC ... H04W 88/10; H04W 24/10; H04W 36/305; H04W 48/16; H04W 76/16; H04W 88/06;
(Continued)

(56) References Cited

U.S. PATENT DOCUMENTS

2009/0046573 A1* 2/2009 Damnjanovic ...... H04J 11/0093
370/216
2009/0245176 A1* 10/2009 Balasubramanian ........................
H04W 48/20
370/328
(Continued)

FOREIGN PATENT DOCUMENTS

EP    3001716 A1    3/2016

OTHER PUBLICATIONS

International Search Report dated May 17, 2017 for International Application PCT/US2017/018580.
(Continued)

*Primary Examiner* — Un C Cho
*Assistant Examiner* — Peter K Mak
(74) *Attorney, Agent, or Firm* — Schwabe, Williamson & Wyatt, P.C.

(57) ABSTRACT

Techniques for 60 GHz long term evolution (LTE)—wireless local area network (WLAN) aggregation (LWA) for keeping a 60 GHz channel alive for fifth generation (5G) and beyond are discussed herein. An apparatus of a 5G/long term evolution (LTE) evolved NodeB (eNB) is connected to a 60 GHz access point (AP) via an Xw interface, and has a baseband circuit with one or more baseband processors. The baseband circuit encodes one or more measurement events,
(Continued)

wherein upon receipt by a user equipment (UE) sets a trigger to measure a 60 GHz access point.

25 Claims, 8 Drawing Sheets

(51) Int. Cl.

| | |
|---|---|
| *H04W 88/10* | (2009.01) |
| *H04W 76/19* | (2018.01) |
| *H04B 7/06* | (2006.01) |
| *H04W 76/16* | (2018.01) |
| *H04W 48/16* | (2009.01) |
| *H04W 88/06* | (2009.01) |
| *H04W 36/14* | (2009.01) |
| *H04B 17/318* | (2015.01) |
| *H04W 76/18* | (2018.01) |
| *H04W 24/10* | (2009.01) |
| *H04W 92/20* | (2009.01) |
| *H04W 64/00* | (2009.01) |
| *H04W 72/04* | (2009.01) |
| *H04W 84/12* | (2009.01) |

(52) U.S. Cl.
CPC ........... *H04W 24/10* (2013.01); *H04W 36/14* (2013.01); *H04W 48/16* (2013.01); *H04W 76/16* (2018.02); *H04W 76/18* (2018.02); *H04W 76/19* (2018.02); *H04W 88/06* (2013.01); *H04W 64/003* (2013.01); *H04W 72/0453* (2013.01); *H04W 84/12* (2013.01); *H04W 92/20* (2013.01)

(58) Field of Classification Search
CPC . H04W 92/20; H04W 84/12; H04W 72/0453; H04W 64/003; H04B 17/318; H04B 7/0617

See application file for complete search history.

(56) References Cited

U.S. PATENT DOCUMENTS

| | | | |
|---|---|---|---|
| 2013/0088983 A1 | 4/2013 | Pragada et al. | |
| 2013/0321225 A1* | 12/2013 | Pettus | H01Q 3/08 343/765 |
| 2014/0233396 A1 | 8/2014 | Marinier et al. | |
| 2015/0223088 A1 | 8/2015 | Niu et al. | |
| 2015/0382171 A1 | 12/2015 | Roy et al. | |
| 2016/0095108 A1* | 3/2016 | Ryoo | H04L 5/0007 370/329 |
| 2016/0100378 A1* | 4/2016 | Chang | H04W 64/003 455/456.5 |
| 2016/0157165 A1* | 6/2016 | Xie | H04W 36/0083 455/434 |
| 2018/0255507 A1* | 9/2018 | Nagasaka | H04W 4/00 |
| 2018/0279251 A1* | 9/2018 | Wigren | H04W 24/10 |
| 2018/0317132 A1* | 11/2018 | Hoehne | H04W 28/0236 |
| 2018/0343047 A1* | 11/2018 | He | H04B 7/0645 |

OTHER PUBLICATIONS

"LTE Aggregation & Unlicensed Spectrum." The Voice of 5G for the Americas. Nov. 2015. 27 pages.

Rappaport, Theodore S. et al. "Millimeter Wave Mobile Communications for 5G Cellular: It Will Work!." IEEE Access. Revised Feb. 3, 2013, accepted Apr. 8, 2013, date of publication May 10, 2013, date of current version May 29, 2013. 15 pages.

"Text proposal on WLAN/3GPP radio interworking solution 3." Source: Qualcomm Incorporated, Ericsson, Orange, CATT, Huawei, China Unicom, CMCC, ZTE. Agenda Item: 5.1.1. 3GPP TSG-RAN#82, May 20-24, 2013 Fukuoka, Japan. R2-132194. 6 pages.

"AP scanning and discovery enhancement." Source: Huawei, HiSilicon. Agenda Item: 5.1.2. 3GPP TSG Ran WG2 Meeting #82 Fukuoka, Japan, May 20-24, 2013. R2-131967.

"Consideration on WLAN scanning and power consumption." Source: New Postcom. Agenda Item: 5.1.2. 3GPP TSG RAN WG2 Meeting #82 Fukuoka, Japan, May, 20-24, 2013. R2-131715. 4 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)." 3GPP TS 36.300 V13.3.0 (Mar. 2016). Lte Advanced Pro. 84 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)." 3GPP TS 36.300 V13.3.0 (Mar. 2016). Lte Advanced Pro. 44 pages.

LTE; Evolved Universal Terrestrial Radio Access (E-UTRA); Radio Resource Control (RRC); Protocol specification (3GPP TS 36.331 version 13.1.0 Release 13). ETSI TS 136 331 V13.1.0 (Apr. 2016) Lte Advanced Pro. 729 pages.

Frenzel, Lou. "Millimeter Waves Will Expand the Wireless Future." ICONS of Infrastructure. Infrastructure Electronics. Mar. 6, 2013. 25 pages.

* cited by examiner

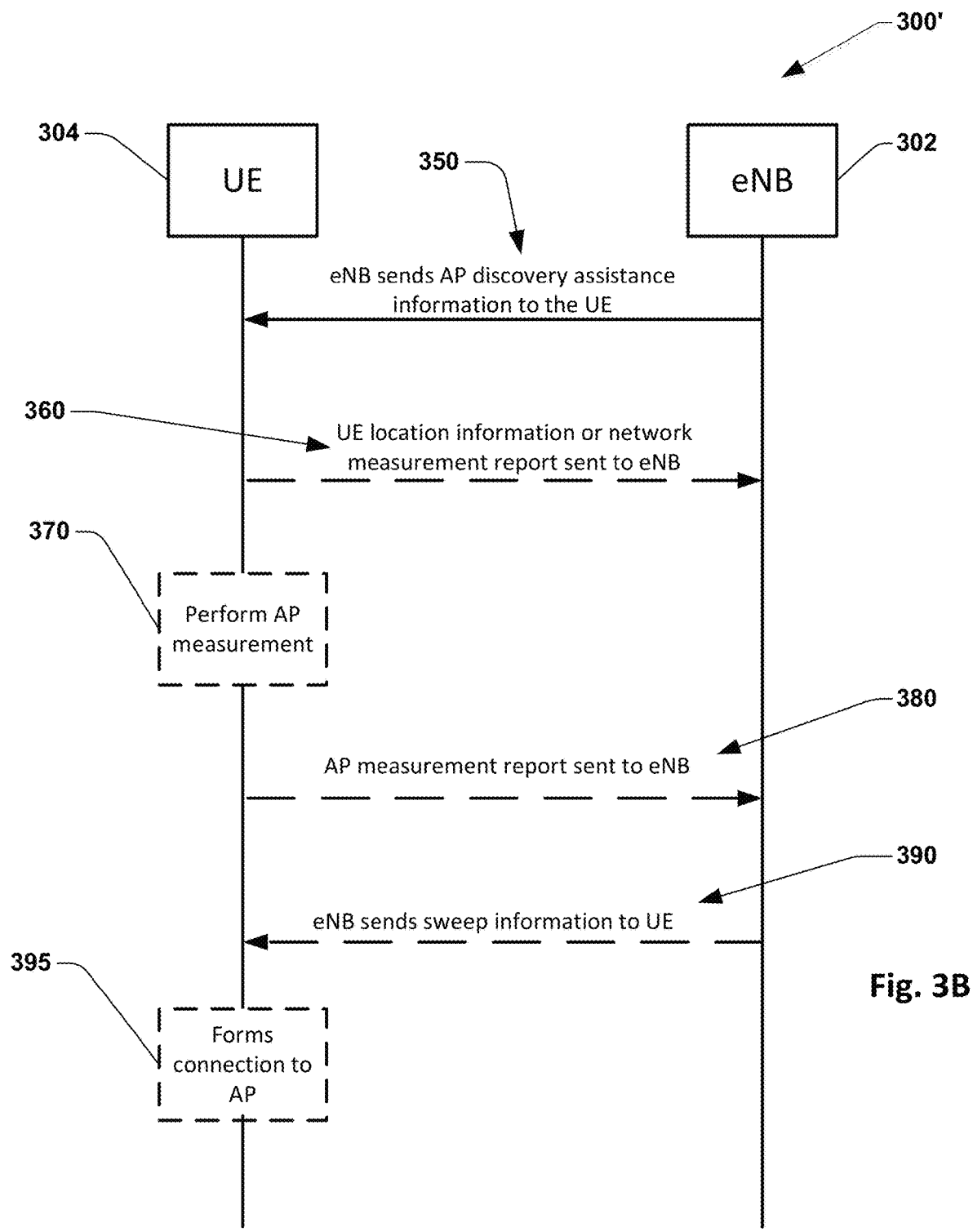

60GHZ-LWA SUPPORT: DISCOVERY AND KEEP ALIVE

REFERENCE TO RELATED APPLICATIONS

This application is a National Phase entry application of International Patent Application No. PCT/US2017/018580 filed Feb. 20, 2017, which claims priority to U.S. Provisional Application 62/320,249 filed on Apr. 8, 2016, entitled "60 GHZ-LWA SUPPORT: DISCOVERY AND KEEP ALIVE" in the name of Candy Yiu et al. and is hereby incorporated by reference in its entirety.

FIELD

The present disclosure relates to the field of wireless technology, and more specifically for techniques for enhanced long term evolution—wireless local area network aggregation (eLWA) with 60 GHz access points (AP), for fifth generation (5G) cellular technologies and beyond.

BACKGROUND

In order to satisfy the ever-increasing demand for data, fifth generation (5G) radio access technologies will involve communication at very high carrier frequencies, from a 60 GHz access point (AP), where bandwidth is more plentiful and faster data speeds may be reached. It would be advantageous to incorporate these 60 GHz APs into the current long term evolution (LTE) communication system, employed by most cellular providers operating in telecommunication industry today, in order to provide a seamless user experience.

Cellular communications were conventionally between an evolved NodeB (eNB) and a user equipment (UE). With the advent of enhanced long term evolution—wireless local area network aggregation (eLWA), wireless communication networks may also include one or more wireless access points (APs). The use of long term evolution in tandem with wireless access points may improve various characteristics of wireless communications, such as data speed, power consumption, bandwidth allocation, data capacity, and cost.

BRIEF DESCRIPTION OF THE DRAWINGS

FIGS. 3A & 3B are diagrams illustrating example embodiments for LTE assisted information for access point (AP) discovery.

DETAILED DESCRIPTION

Figure 1:
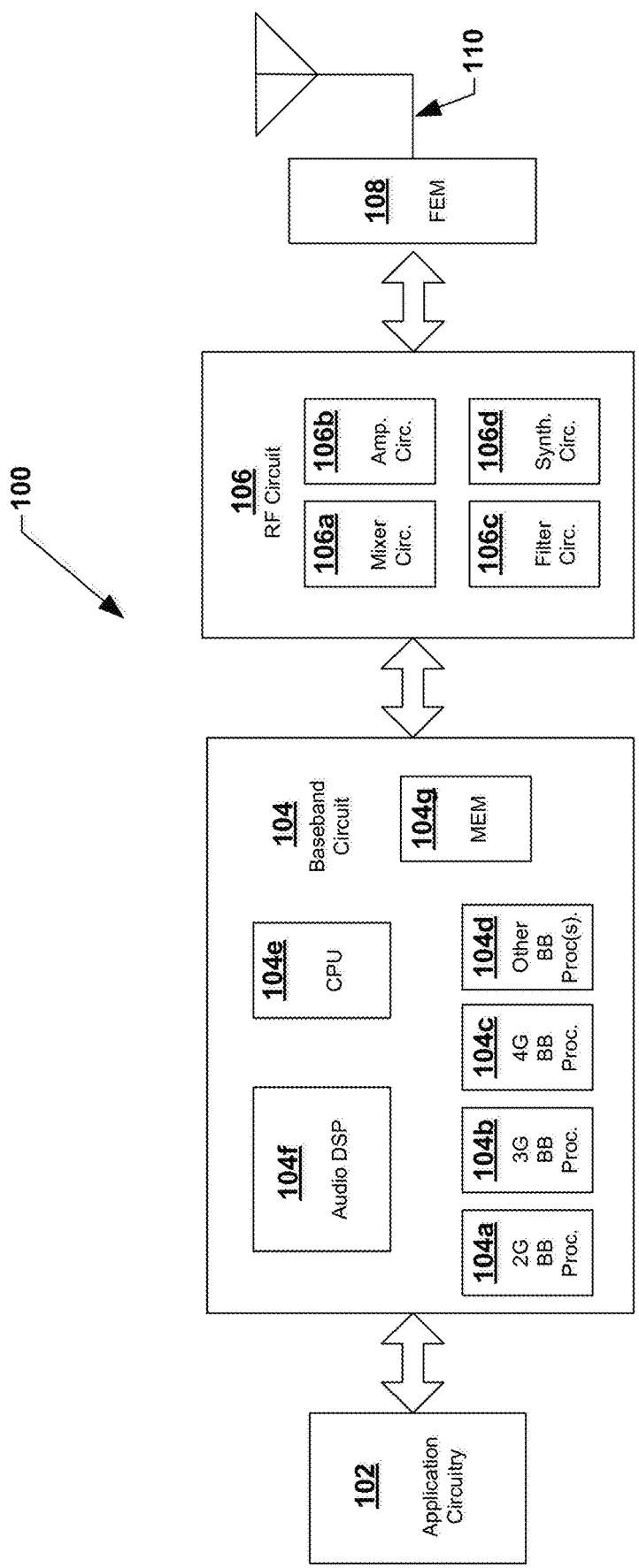
FIG. 1 is a block diagram illustrating example components of an electronic device which may be used in an evolved NodeB, user equipment (UE), a wireless access point, or some other electronic device.

The present disclosure will now be described with reference to the attached figures, wherein like reference numerals are used to refer to like elements throughout, and wherein the illustrated structures and devices are not necessarily drawn to scale. As utilized herein, terms "component," "system," "interface," "decoder" and the like are intended to refer to a computer-related entity, hardware, software (e.g., in execution), or firmware. For example, a component can be a processor, a process running on a processor, an object, an executable, a program, a storage device, an electronic circuit or a computer with a processing device. By way of illustration, an application running on a server and the server can also be a component. One or more components can reside within a process, and a component can be localized on one computer and/or distributed between two or more computers.

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Signals and information may be herein referenced as being sent or received. If a signal or information is being sent it is to be understood that this signal or information is also being encoded by an electrical device or processor. If a signal or information is being received it is to be understand that this signal or information is also being decoded by an electrical device or processor.

Embodiments herein may relate to adding 60 GHz, and other high band frequency support, for enhanced LTE—WLAN aggregation (eLWA). eLWA offers potential enhancements to support a 60 GHz new band and channels (e.g. discovery 60 GHz AP using measurements) and increased data rates for IEEE 802.11ax, IEEE 802.11ad, and IEEE 802.11ay (e.g. by package data convergence protocol (PDCP) optimizations). The Wireless Gigabit Alliance (60 GHz) was accepted as a standard in IEEE 802.11ad to target short-range speeds up to 7 Gb/s in about 2 GHz of spectrum around 60 GHz. The protocol is being further enhanced in IEEE 802.11 ay.

Embodiments herein may relate to enhancements for AP discovery, particularly for 60 GHz, and keeping the high frequency channel alive when the high frequency channel may be unstable. Aspects of various embodiments may relate to LTE assisted information for AP discovery and keeping the high frequency connection alive for eLWA. These embodiments may be described with respect to 60 GHz, but the technology is not limited to 60 GHz. This technology may apply to any similar frequency bands, such as 28 GHz, or other high frequency bands.

Embodiments described herein may be implemented into a system using any suitably configured hardware and/or software. FIG. 1 illustrates, for one embodiment, example components of an electronic device 100. In some embodiments, the electronic device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106*a*, amplifier circuitry 106*b* and filter circuitry 106*c*. The transmit signal path of the RF circuitry 106 may include filter circuitry 106*c* and mixer circuitry 106*a*. RF circuitry 106 may also include synthesizer circuitry 106*d* for synthesizing a frequency for use by the mixer circuitry 106*a* of the receive signal path and the transmit signal path. In some embodiments, the mixer circuitry 106*a* of the receive signal path may be configured to down-convert RF signals received from the FEM circuitry 108 based on the synthesized frequency provided by synthesizer circuitry 106*d*. The amplifier circuitry 106*b* may be configured to amplify the down-converted signals and the filter circuitry 106*c* may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106*a* of the receive signal path may comprise passive mixers, although the scope of the embodiments is not limited in this respect.

In some embodiments, the mixer circuitry 106*a* of the transmit signal path may be configured to up-convert input baseband signals based on the synthesized frequency provided by the synthesizer circuitry 106*d* to generate RF output signals for the FEM circuitry 108. The baseband signals may be provided by the baseband circuitry 104 and may be filtered by filter circuitry 106*c*. The filter circuitry 106*c* may include a low-pass filter (LPF), although the scope of the embodiments is not limited in this respect.

In some embodiments, the mixer circuitry 106*a* of the receive signal path and the mixer circuitry 106*a* of the transmit signal path may include two or more mixers and may be arranged for quadrature downconversion and/or upconversion respectively. In some embodiments, the mixer circuitry 106*a* of the receive signal path and the mixer circuitry 106*a* of the transmit signal path may include two or more mixers and may be arranged for image rejection (e.g., Hartley image rejection). In some embodiments, the mixer circuitry 106*a* of the receive signal path and the mixer circuitry 106*a* may be arranged for direct downconversion and/or direct upconversion, respectively. In some embodiments, the mixer circuitry 106*a* of the receive signal path and the mixer circuitry 106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106*d* may be a fractional-N synthesizer or a fractional N/N+1 synthesizer, although the scope of the embodiments is not limited in this respect as other types of frequency synthesizers may be suitable. For example, synthesizer circuitry 106*d* may be a delta-sigma synthesizer, a frequency multiplier, or a synthesizer comprising a phase-locked loop with a frequency divider.

The synthesizer circuitry 106*d* may be configured to synthesize an output frequency for use by the mixer circuitry 106*a* of the RF circuitry 106 based on a frequency input and a divider control input. In some embodiments, the synthesizer circuitry 106*d* may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106*d* of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the electronic device 100 may include additional elements such as, for example, memory/storage, display, camera, sensor, and/or input/output (I/O) interface.

In some embodiments, the electronic device of FIG. 1 may be configured to perform one or more processes, techniques, and/or methods as described herein, or portions thereof.

Figure 2A:
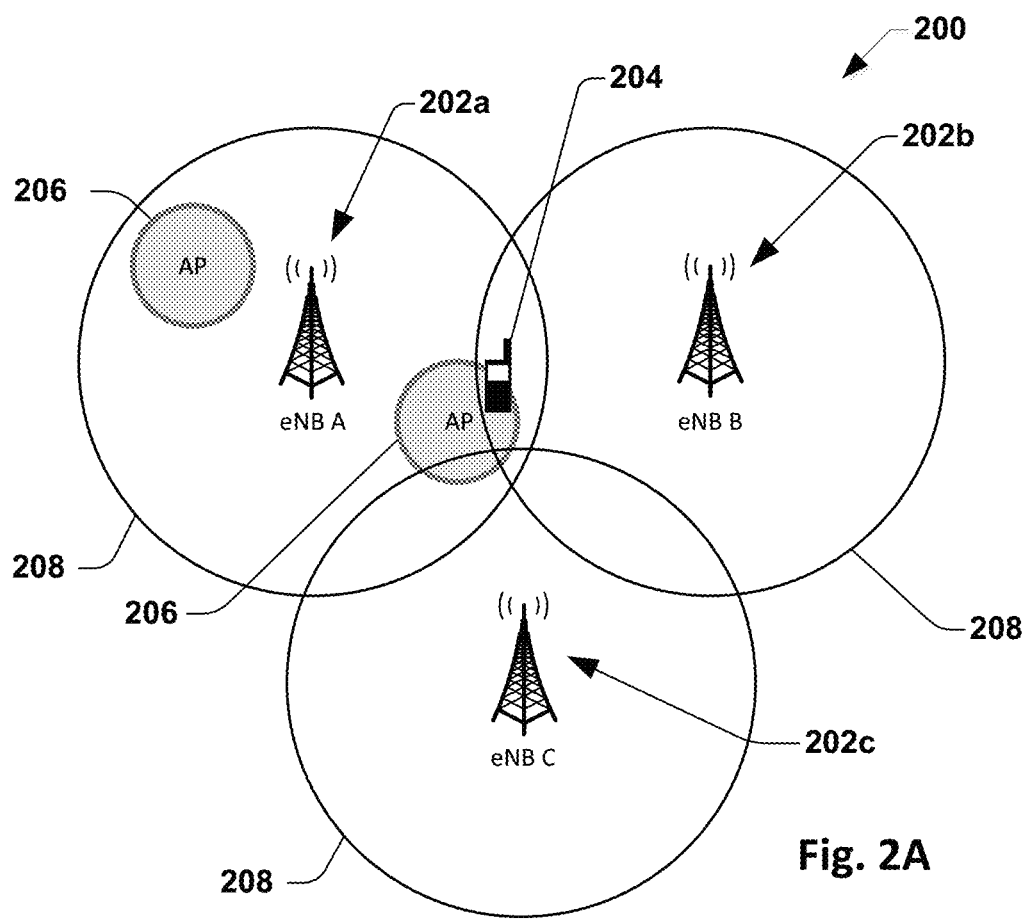
FIGS. 2A & 2B are diagrams illustrating an example eLWA communications network with access point deployment.

FIG. 2A illustrates, for one embodiment, an example communications network 200 comprising evolved NodeBs (eNBs) 202, user equipment (UE) 204, access points (APs) 206 and coverage areas 208 of the eNBs 202. FIG. 2A illustrates 3 eNBs 202a, 202b and 202c with two APs 206 deployed within the coverage area 208 of eNB A 202a. One of the APs 206 is also close to an edge of the coverage area 208 of eNB B 202b and eNB C 202c. For this example, the network can configure UE 204 to measure eNB B 202b and eNB C 202c. If the UE 204 is within the coverage area 208 of eNB B 202b, or eNB C 202c, a network measurement report from the UE 204 may be triggered. The network can estimate the location of the UE 204 by using a triangulation method from the eNB 202, the location of the AP 206, or a combination therein. The access point 206 may support one or more high frequency bands, such as frequency bands around 60 GHz. The AP 206 may also comprise other high frequency bands, such as 2.4 GHz, 5 GHz and 28 GHz frequency bands. While many of the embodiments discussed herein may relate to 60 GHz, the same properties and methods may apply to any other similar frequency bands, such as those between 57 GHz and 64 GHz, 28 GHz, or other high frequency bands. Herein, the access point (AP) 206 also may be referred to as a WiGig wireless terminal, WLAN termination, or simply a wireless terminal (WT).

The electrical device 100 of FIG. 1 may be incorporated into the circuitry of the eNB 202a, 202b, 202c, UE 204, the AP 206, or any combination therein. Herein, when referencing the configuration of the eNB, UE, or AP, it is to be understood the configuration of these elements is in reference to the configuration of the electrical device of the eNB, UE, or AP, respectively.

Figure 2B:
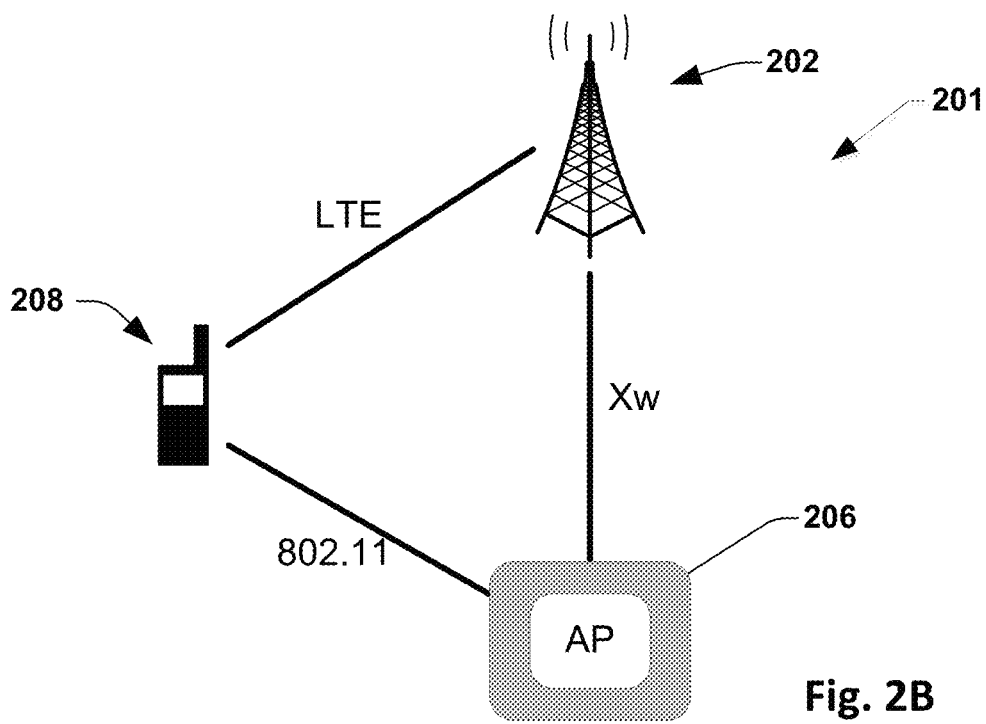

FIG. 2B illustrates, for one embodiment, an enhanced LTE-WLAN aggregation (eLWA) network 201 comprising an eNB 202, AP 206 and UE 204. Also illustrated in FIG. 2B are the communications standards which connect these three types of devices. The eNB 202 connects to the UE 204 via LTE. The AP 206 connects to the UE 204 via the IEEE 802.11 specifications for implementing a WLAN communication.

The eLWA network specifications are further described in the technical specification of 3GPP TS36.331 version 13.2.0 Release 13. 3GPP TS36.331 version 13.2.0 Release 13 is hereby incorporated by reference.

Also illustrated in FIG. 2B is an interface connecting the eNB and the AP 206, used in enhanced LTE-WLAN aggregation (eLWA), called Xw. Xw serves as the connection between the eNB 202 with APs 206, to incorporate the APs into the eLWA network. Through Xw, the eNB 202 schedules packets to arrive at the UE 204 via the AP 206. For example, this is performed at the LTE packet data convergence protocol (PDCP) layer by sending PDCP protocol data units (PDU). Through this eLWA architecture the packets arrive at the UE 204 via either the LTE from the eNB 202 or via the IEEE 802.11 protocol from the AP 206.

Dependent on network deployment, the coverage area 208 of the eNB 202 may overlap no access points, or one or more access points. Further, there may be one eNB 202, or a plurality of eNBs (as illustrated in FIG. 2A).

Due to the signal attenuation at high frequencies, such as 60 GHz, additional power may be required for the UE 204 to perform measurements on the high frequency band. In some cases, there may not be AP support within the specific coverage area 208 where the UE 204 is located. In this instance, it may be unneeded for the UE to perform measurements on the high frequency, or 60 GHz, band. One way to optimize the eLWA network is to provide measurement events or WiGig location information to the UE 204 via LTE.

Figure 3A:
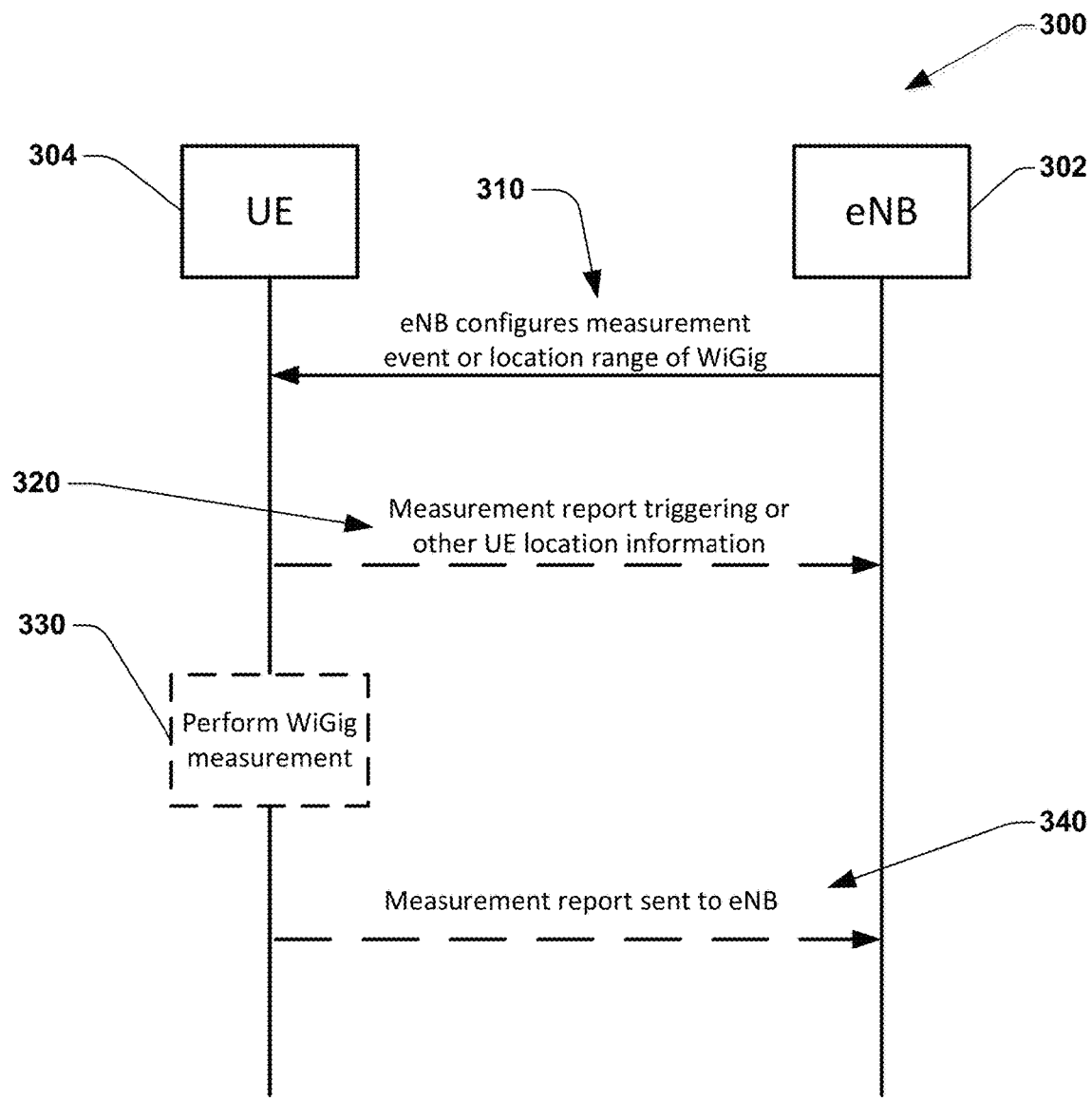

FIG. 3A illustrates, for one embodiment, a method of LTE assisted information for AP discovery procedure 300. The direction of arrows of the ladder diagram indicate the direction of signal transmission. The arrows directed to the left, indicate the signal is being encoded by the eNB 302, transmitted to and decoded by the UE 304. The arrows directed to the right, indicate the signal is being encoded by the UE 304, transmitted to and decoded by the eNB 302. The presence of solid lines or dashed lines indicate whether that particular step will be performed or may optionally be performed, respectfully.

Referring initially to FIG. 3A, the network already configures a measurement event via a message from the eNB 302 to the UE 304. For example, the eNB 302 may configure a measurement event that if a measurement of a neighboring cell is greater than or within some range of the present cell by some predetermined threshold, then the UE 304 should initiate and send a measurement report to the eNB 302. Using this same measurement event configuration signaling, the eNB 302 according to the present embodiment configures measurement for 60 GHz (indicating a 60 GHz band and/or 60 GHz channels in a WLAN configuration) if 60 GHz access points (APs) supporting LWA are deployed. This configuration of a measurement event is illustrated at 310 in FIG. 3A. Likewise if the UE 304 does not receive such a configuration measurement event for 60 GHz at 310, the UE 304 can assume there is no 60 GHz deployed by the network. It should be noted that in one embodiment the eNB 302 may configure multiple measurement events and trigger the UE 304 to send a measurement report if all the specified events are satisfied. For example, referring back to FIG. 2A, three eNBs 202a, 202b, 202c are shown with a 60 GHz AP 206 close to a cell edge of both eNB B 202b and eNB C 202c, and if the signal is within a predetermined range a measurement report is triggered. Further, according to one embodiment the predetermined range can be estimated by using a triangulation method of another eNB and the location of the 60 GHz AP. Alternatively, the predetermined range can be estimated using other history information collected from other UEs.

Still referring to FIG. 3A, upon the eNB 302 configuring a measurement event at 310, the UE 304 may send back acknowledgement of the measurement report triggering at 320, however, this act may be optional and is thus illustrated in a dashed line in FIG. 3A. In one embodiment, if the one or more measurement events are not satisfied at the UE 304, no further action is taken at the UE 304, however, if the one or more measurement events are satisfied, the UE 304 then initiates a 60 GHz measurement at 330 to perform the discovery. Act 330 in FIG. 3A is illustrated in dashed lines because the WiGig measurement is performed in one embodiment only when the one or more measurement events are satisfied. The discovery procedure then concludes at 340, wherein the UE 304 sends a measurement report to the eNB 302 if a 60 GHz access point is found at operation 330. As the possibility exists that no 60 GHz AP is found during act 330, the sending of the measurement report 340 is illustrated as a dashed line as being optional.

Referring now to FIG. 3B, an alternative signaling procedure 300' is provided to determine whether a present eNB coverage area overlaps a 60 GHz AP. The eNB 302 is configured to determine if there is a UE 304 within the coverage area 208 of the eNB based on the deployment of the UE. The eNB 302 also determines if there is an access point 206 overlapping the coverage area 208 of the eNB in which the UE 304 is located. In the event of there being a UE 304 and an AP 206 in the same coverage area 208 of the eNB 302, the eNB then sends AP discovery assistance information to the UE at 350. Ultimately, if an AP 206 overlaps a coverage area 208, then the UE may perform the AP measurement and then form the connection to the AP. If there are no APs 206 which overlap the coverage area 208 in which the UE 304 is located, then the AP measurement need not be performed.

In one embodiment this information can sent via either a broadcast in a system information block (SIB) or as a dedicated signal to the UE 304. This would be advantageous in that the UE 304 which is usually connected to the eNB 302 via the LTE network, can receive already known AP discovery assistance information from the eNB. This may allow the UE 304 to avoid unnecessarily scanning the airwaves in an attempt to locate an AP 206, and consume UE battery life. In one embodiment the AP discovery assistance information sent to the UE at 350 comprises information which assists the UE in the AP discovery process.

Upon receipt of the AP discovery assistance information at 350, the UE 304 is configured to, optionally, encode and transmit UE location information to the eNB at 360. The information encoded and transmitted from the UE 304 to the eNB 302 at 360 is discussed in greater detail below in reference to step 420 of FIG. 4, wherein the UE location information or the network measurement report triggering is sent to the eNB. For example, while the eNB 202 of FIG. 2A knows when a UE 204 is in the coverage area, 208, the eNB might not know the actual location of the UE. It would then necessary for the UE location information to be sent to the eNB 202 to assist in determining the location of the UE 204.

Based on the information received and decoded by the UE at 350, the UE 304 is optionally configured to perform an AP measurement at 370. This act is considered optional, as it is a possibility that based upon information received at 350, no AP measurement is warranted. In one embodiment, to perform the AP measurement at 370, the UE 304 scans the surrounding area searching for a nearby access point 206. As described above, the UE 304 may also decide the AP measurement is unnecessary, and therefore refrain from performing the AP measurement at 370. Whether an AP measurement is performed at 370 is based on information which the UE 304 has previously received. This information could be, for example, whether or not there is an AP 206 in the vicinity of the UE 304, the strength of nearby AP signal, the location of the UE itself, whether there are other wireless frequency bands, such as 2.4 GHz or 5 GHz available, or any combination thereof. When referencing 60 GHz technology, the AP measurement may also be called a 60 GHz discovery, or a WiGig discovery.

The UE 304 may also not perform the AP measurement at 370. For example, this would occur if the UE 304 is not in the vicinity of an AP 306, or if that particular AP is blacklisted. If the UE 304 performs AP measurements while not in the vicinity of an AP 306, then the UE would be disadvantageously expending excess power by performing the AP measurement. Therefore, in this instance, it would be advantageous for the UE 304 to omit performing the AP measurement.

The UE 304 is then configured to optionally encode and transmit an AP measurement report to the eNB at 380 based on the AP measurement of 370. The AP measurement report of 380 is optionally encoded and transmitted to the eNB 302 based on whether an AP was found during the AP measurement at 370, the type of AP found during measurement, or both. In response to the AP measurement report the eNB 302 optionally encodes and transmits a sweep information to the UE at 390. The UE 304 is configured to choose whether or not to form the connection to the AP at 395 based on the AP location information, the AP measurement, sweep information, or a combination thereof.

Figure 4:
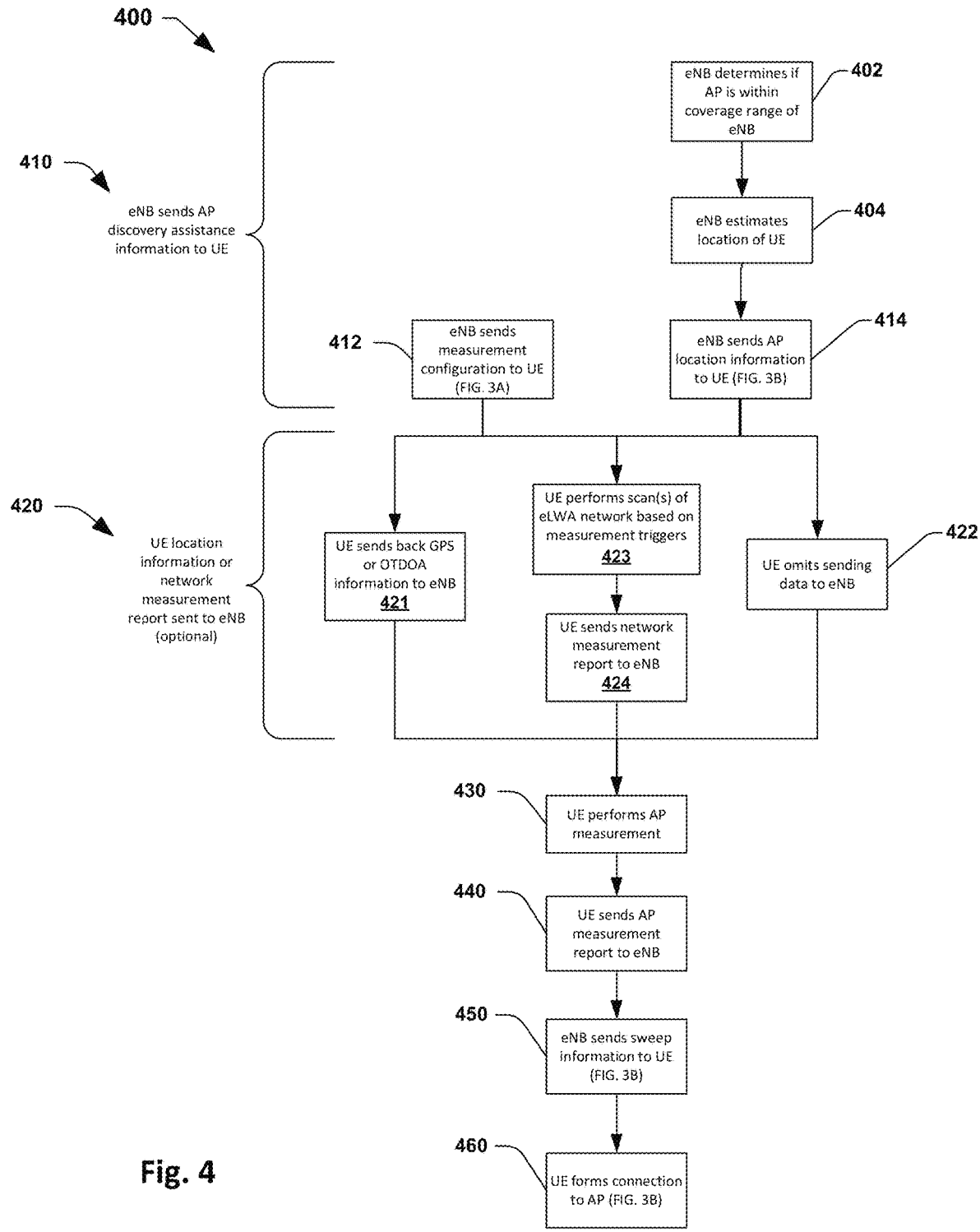
FIG. 4 is a flowchart illustrating an embodiment for LTE assisted information for AP discovery procedure.

FIG. 4 is a flowchart illustrating, for one embodiment, the method of LTE assisted information for an AP discovery procedure 400. It should be noted that FIG. 4 is provided simply to illustrate the alternative actions that may be taken based on the two different embodiments provided and discussed with respect to FIGS. 3A and 3B, respectively. Act 410 generically covers both embodiments and comprises the eNB sending discovery assistance information to the UE which might include a measurement configuration at 412 or AP location information at 414 depending on the differing embodiments of FIGS. 3A and 3B.

More particularly, at 402, the eNB 202 determines if the AP 206 is within the coverage area 208 of the eNB 202. In one embodiment no APs 206 may be in the coverage area, while in another embodiment one or more APs may be within the coverage area 208 of the eNB 202. The eNB 202 then estimates the location of the UE at 404. This estimate may vary in accuracy and the type of AP discovery assistance information sent to the UE at 410 depends thereon. The eNB is configured to send the AP discovery assistance information at 410 to the UE 204 based on the location estimate of the UE and if the AP 206 is within the coverage area 208 of the eNB 202. The AP discovery assistance information comprises either a measurement configuration to the UE at 412 or an AP location information at 414.

The measurement configuration of 412 (embodiment of FIG. 3A) comprises a request for a network measurement report, if appropriate. Based on the type of measurement configuration sent by the eNB, either a UE location information or a network measurement report is encoded by the UE 204 and returned to the eNB at 420. The UE location information comprises global positioning system (GPS) data, an observed time difference of arrival (OTDOA) information, or other location information to be transmitted to the eNB, as shown in step 421 of FIG. 4. Alternatively, if a network measurement report is requested, the UE 204 performs one or more scans of the eLWA network at 423. Based thereon, the UE optionally sends the network measurement report to the eNB at 424.

In an alternative embodiment, the measurement configuration of 412, configured by the eNB 202, requests the UE 204 to search for 60 GHz bands, 60 GHz channels, or other high frequency channels which are active or deployed in the eLWA network. Alternatively, the eNB 202 may send an indicator to the UE 204 to signal the presence of APs 206 in the network. If not configured, the UE may assume 60 GHz is not deployed by the network.

For example, FIG. 2A shows a 3 eNB deployment with an access point 206 near the edge of the coverage areas 208 of eNB B 202b and eNB C 202c. In this instance, the eNB 202 may send the measurement configuration of 412, requesting a measurement report from the UE 204. The UE 204 measures the strength of signal of the eNB(s) 202, and generates a measurement report therefrom. The UE may also measure the received signal strength indicator (RSSI) on one or more frequency bands, such as 2.4 GHz, 5 GHz, 28 GHz, and 60 GHz, of the AP and determine information therefrom. This measurement report may be determined based on measuring the strength of the signal of the eNB 202, comparing the strength of signal of the eNB to a threshold, measuring the RSSI on one or more frequency bands, comparing the measured RSSI to a threshold, or a combination thereof.

The eNB then uses the information obtained from the network measurement report of 424 to triangulate the position of the UE 204 and determine location information therefrom. Location information comprises the position of the UE 204, the coverage area 208 of the eNBs 202, the location of the access points 206, or combination thereof. In other embodiments, the eNB 202 estimates location information by other history information which was previously collected from other UE 204. The eNB 202 then uses the location information to send relevant access point 206 location information to the UE at 425.

In another embodiment, the access point discovery assistance information being sent to the UE at 410 may comprise the eNB sending access point location information to the UE 414. In this embodiment, the eNB may send the location information of the access point, via a broadcast in the system information block (SIB) of the signal or via a dedicated signal. In this embodiment, the UE omits sending location information or a network measurement report to the eNB 422.

At this point in the AP discovery process, in one example, the eNB 202 has determined the UE 204 and AP 206 are within the same coverage area 208 of an eNB. The eNB 202 has sent AP discovery assistance information to the UE 204. The UE 204 has returned UE location information or a network measurement report to the eNB 204. The eNB 202 has sent back AP location information to the UE 204. Therefrom, the UE is about to decide whether or not to perform an AP measurement in order to obtain information on a potential nearby AP.

In one embodiment, the UE performs an AP measurement at 430. This AP measurement involves the UE 204 searching on one or more frequency bands in order to detect an AP 206. Alternatively, the UE may omit performing an AP measurement at 432. As discussed in regards to step 330, it may be advantageous for the UE 204 to omit performing the AP measurement. For example, this would occur if the UE 204 is not in the vicinity of an AP 206, or if that particular AP is blacklisted. Further, if the UE 204 determines a connection with the AP 206 is possible without performing an AP measurement, this step may also be omitted.

If the AP measurement at 430 is performed, the UE 204 is able to encode and transmit the AP measurement report to the eNB at 440. The UE may also omit sending the AP measurement report at 442 to the eNB 202. For example, the AP measurement report may be omitted from being transmitted to the eNB 202, if the UE 204 has low battery, or if the measurement configuration received by the UE directed the UE not to return an AP measurement report. If the UE omits performing the AP measurement at 432, then the UE omits sending any AP measurement report to the eNB at 442, since the AP measurement report does not exist.

Transmission on 60 GHz, and other high frequency bands, requires directional beamforming at both the access point and the UE in order to achieve the signal to noise ratio (SNR) required to establish a communication link. The initial acquisition/access procedure allows the access point and the UE to determine the best transmit(TX)/receive(RX) beamforming directions (beams) for establishing a directional connection with the required SNR. This initial acquisition/access procedure is therefore, in one embodiment, considered an advantageous design element of the IEEE 802.11ad specification. The AP will beam sweep the AP's beam to enable discovery by the UE. The eNB may send the sector level sweep training schedule to the UE to direct the UE to perform a measurement for that particular AP. This method reduces the amount of time the UE requires to connect to the AP. This also reduces the power consumption of the UE, as the UE is not required to continuously scan for the high frequency signal. For example, if there are N number of directional beams on which the UE may transmit, and each beam requires K number of seconds to search for a connection on each beam, the UE then requires N*K seconds during each full scan procedure. However, if the UE receives sweep information, or a sweep training schedule, the time required for the high frequency initialization procedure may be significantly reduced.

The sweep training schedule is generated and sent from the AP 206 to the eNB 202 via the Xw network (See FIG. 2B). The eNB 202 is configured to encode and transmit the sweep information to the UE at 450. In one example, sweep information comprises a sweep training schedule information received from the AP. Sweep information may also include resource information (i.e. time, frequency, codec, etc.), identification, location information, periodicity, duration, or angle information to connect to the AP. Alternatively, the eNB may decide to omit sending sweep information to the UE at 452.

In one embodiment, the UE forms the connection with the access point at 460. Alternatively, if a series of events or triggers have not been met, the UE omits forming the connection with the access point 462. Examples of events and triggers which are required to be met in order for the UE 204 to form the connection with the AP 206 include determining if there is an AP nearby, the quality of the current channel conditions, if there are multiple APs in the same area, and others.

Figure 5:
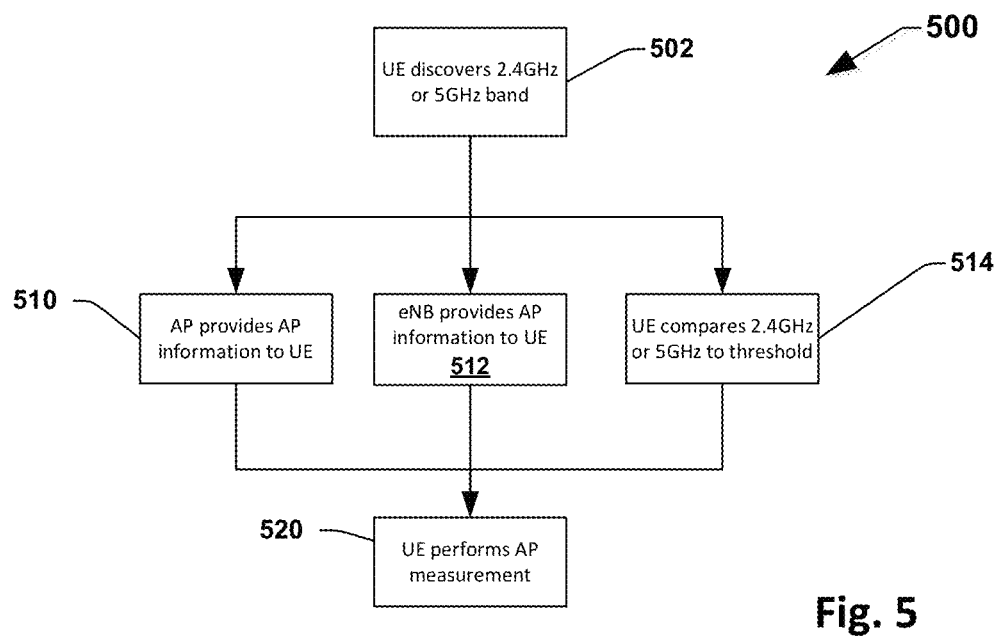
FIG. 5 illustrates an embodiment for WLAN assisted information for AP discovery using 2.4 GHz and 5 GHz.

FIG. 5 illustrates an embodiment for WLAN assisted information for AP discovery using 2.4 GHz and 5 GHz frequency bands 500, which may not require eNB 202 or network support. The discovery procedures discussed herein may relate to 60 GHz, but also relate to other frequencies, such as 28 GHz as well. For example, a single AP is able to support a plurality of frequency bands, such as 2.4 GHz, 5 GHz, 28 GHz, 60 GHz, or a combination thereof. The UE first discovers the 2.4 GHz band or the 5 GHz band at 502, by measuring the received signal strength indicator (RSSI) on either the 2.4 GHz or 5 GHz frequency band. For example, this method is advantageous in that beamforming is not necessary on these frequency bands, and a connection via 2.4 GHz or 5 GHz may be established without expending significant resources. The AP then provides information on its 60 GHz support in beacons and per inquiry from the AP at 510 (for instance, a probe request or any other exchange of management frames). Alternatively, once the UE 204 is connected to this AP 206, the eNB 202 can indicate to the UE the AP's support for the 60 GHz at 512, wherein the UE then performs the AP measurement. The UE then is configured to perform the AP measurement at 520. Optionally, the eNB 202, AP 206, or UE 204 may configure a threshold, whereby the UE compares the 2.4 GHz or 5 GHz signal at 514, in order to approximate the location of the AP. If the AP signal is above the threshold, the UE 204 then performs the AP measurement at 520. If the signal is below the threshold, the UE is configured to not perform the AP measurement. These methods of WLAN assisted information for AP discovery 500 may further optimize the AP discovery procedure and may further reduce UE power consumption, as support from the eNB or network is not required. Additionally, IEEE 802.11 indoor location techniques based on time measurements (TM) or fine timing measurements, (FTM) may also be used by the UE 204 for an AP range assessment through use of a triangulation method.

Further embodiments relate to maintaining the high frequency link between the UE 204 and the AP 206 for the eLWA network 201. High frequency data transmission, 60 GHz for instance, may have the benefit of very high bandwidth and a very high data rate. One disadvantage of the high frequency data transmission may be significant signal attenuation, which can affect the range of transmission and decrease channel stability, especially if there are physical obstructions in the path of the signal. For example, the signal may attenuate when an object such as a person or a wall is directly between the UE 204 and the AP 206.

For this reason, and others, it may be advantageous for the UE 204 to connect to the high frequency AP channel with fallback options. When the UE 204 is connected via LTE to the eNB 202, the LTE may be used as a fallback path when the high frequency AP 206 is not available. Due to high frequency channel characteristics, however, it may be disadvantageous for the UE to detach from the high frequency channel in all instances. For example, the channel loss may be only temporary, and disconnecting immediately may hinder the overall data transmission process. For example, performing the reconnection procedure to the channel can consume significant UE resources. Therefore, it may be beneficial for the UE to maintain the connection to the high frequency channel for a longer period of time, even though the channel may temporarily be less than ideal.

Figures 6A, 6B:
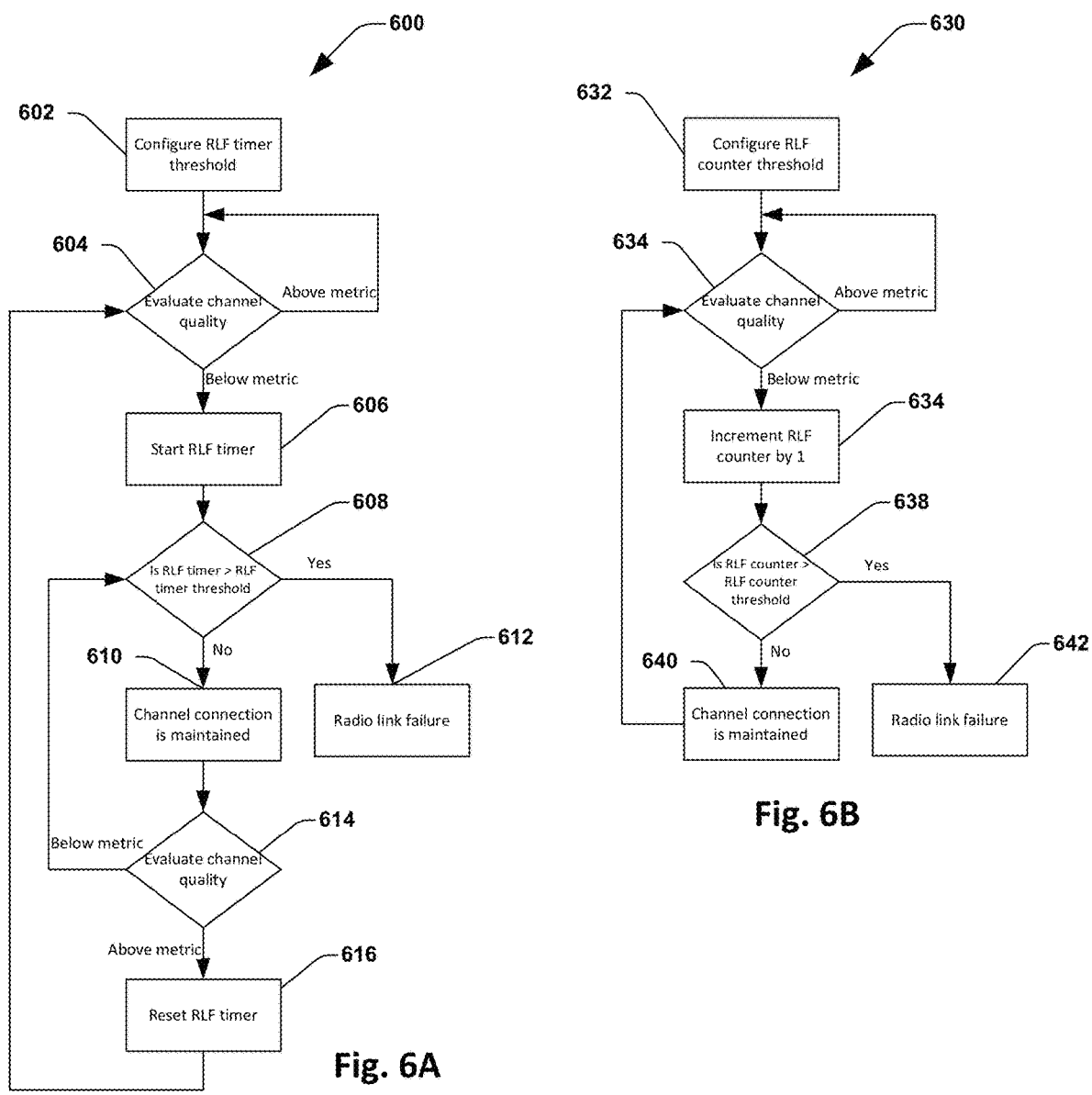
FIG. 6A illustrates an embodiment for keeping the high frequency channel alive using a radio link failure (RLF) timer.
FIG. 6B illustrates an embodiment for keeping the high frequency channel alive using a radio link failure (RLF) counter.

FIG. 6A illustrates an embodiment for keeping the high frequency channel alive using a radio link failure (RLF) timer 600. In one embodiment, the RLF timer is configured by the eNB 202 and implemented by the UE 204. Alternatively, the RLF timer is both configured and implemented by the UE 204. The RLF timer is configured to allow for a period of time that the connection to the AP 206 is maintained, even if the channel quality may be poor, or less than a channel quality metric. The channel quality metric may be predetermined or configured by the eNB 202.

At 602, an RLF timer threshold is configured by either the eNB 202, or is predefined. This timer threshold is set to be long enough to ensure the UE 204 does not declare RLF when the channel undergoes sudden changes. At 604, the UE 204 evaluates the channel quality based on UE implementation of predetermined criteria. Alternatively, the AP 206 uses packet loss to determine channel quality.

If the channel quality is greater than the channel quality metric, then the channel quality will continue to be evaluated at 604. If the channel quality is less than the channel quality metric, the UE 204 starts the RLF timer at 606. The UE 204 then compares the RLF timer to the RLF timer threshold at 608. If the RLF timer is greater than the RLF timer threshold, the UE 204 then declares a radio link failure at 612. When a radio link failure is declared the eNB 202 requests the UE 204 to detach from the high frequency band and release the AP 206. If the RLF timer is less than the RLF timer threshold, then the channel connection is maintained at 610. The eNB 202, UE 204 or AP 206 then evaluates the channel quality at 614. If the channel quality is less than the channel quality metric, then the UE 204 then re-compares the RLF timer to the RLF timer threshold at 610. If the channel quality is greater than the channel quality metric, then the timer is reset at 616 and channel quality is evaluated at 604.

FIG. 6B illustrates an embodiment for keeping the high frequency channel alive using a radio link failure (RLF) counter at 630. In one embodiment, the RLF counter is configured by the eNB 202 and implemented by the UE 204. Alternatively, the RLF timer is both configured and implemented by the UE 204. The RLF counter is configured to allow for a period of time that the connection to the AP 206 is maintained, even if the channel quality may be poor, or less than a channel quality metric. The channel quality metric may be predetermined or configured by the eNB 202.

At 632, an RLF counter threshold is configured by either the eNB 202, the UE 204, or is predefined. At 634, the eNB 202, UE 204 or AP 206 evaluates the channel quality. If the channel quality is better than the channel quality metric, then the channel quality will continue to be evaluated at 634. If the channel quality is less than the channel quality metric, the UE 204 increments the RLF counter by 1 at 636. The UE 204 then compares the RLF counter to the RLF counter threshold at 638. If the RLF counter is greater than the RLF counter threshold, then the UE 204 declares a radio link failure at 642. If the RLF counter is less than the RLF counter threshold, then the channel connection is maintained at 640. The eNB 202, UE 204 or AP 206 then returns to evaluate the channel quality at 634. Timers or delays may also be used in this embodiment for calibration of the counter mechanism.

Figure 6C:
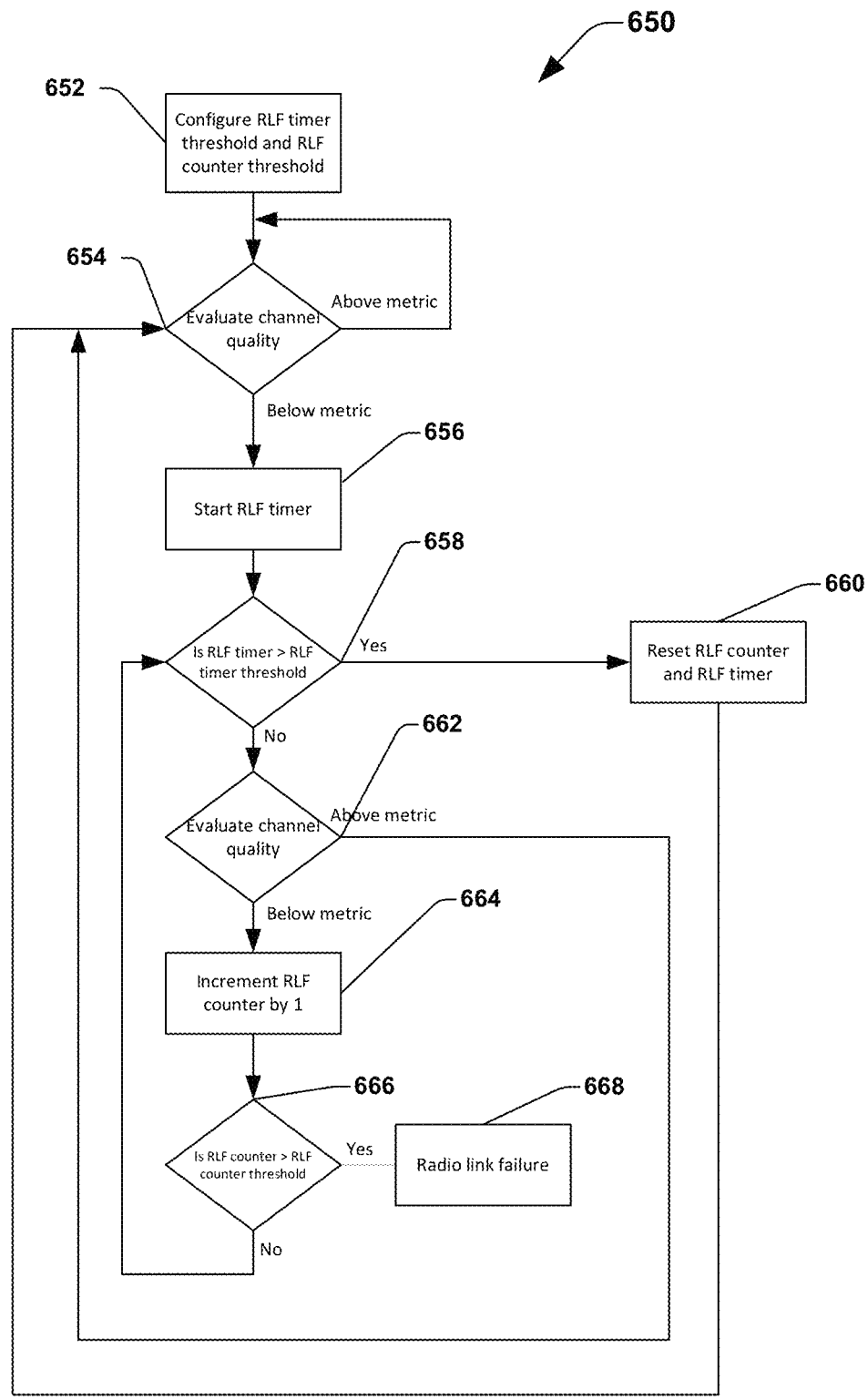
FIG. 6C illustrates an embodiment for keeping the high frequency channel alive using a radio link failure (RLF) timer and a RLF counter.

FIG. 6C illustrates an embodiment for keeping the high frequency channel alive using a radio link failure (RLF) timer and RLF counter. The RLF timer and RLF counter work in tandem to allow for a period of time that the connection to the AP 206 is maintained, even if the channel quality may be poor, or less than a channel quality metric. In this embodiment, to declare a radio link failure, the RLF counter must exceed the RLF counter threshold within a specified period of time. If the RLF counter does not exceed the RLF counter threshold before the RLF timer exceeds the RLF timer threshold, then a radio link failure is not declared, the channel is maintained, and the RLF counter and RLF timer is reset.

At 652, an RLF timer threshold and RLF counter threshold are configured by either the eNB 202. At 654, the eNB 202, UE 204 or AP 206 evaluates the channel quality. If the channel quality is above the channel quality metric, then the channel quality will continue to be evaluated at 654. If the channel quality is less than the channel quality metric, the UE 204 starts the RLF timer at 656. The UE 204 then compares the RLF timer to the RLF timer threshold at 658. If the RLF timer is greater than the RLF timer threshold, then the eNB 202 or UE 204 resets the RLF counter and RLF timer at 660. The eNB 202 or UE 204 then evaluates the channel quality at 654.

At 658, however, if the RLF timer is less than the RLF timer threshold, eNB 202, UE 204 or AP 206 evaluates the channel quality at 662. If the channel quality is above the channel quality metric, then the eNB 202, UE 204 or AP 206 evaluates the channel quality at 654. If the channel quality is less than the channel quality metric, UE 204 increments the RLF counter by 1. The UE 204 compares the RLF counter to the RLF counter threshold at 666. If the RLF counter is greater than the RLF counter threshold, then the UE 204 declares a radio link failure 668. When a radio link failure is declared the eNB 202 requests the UE 204 to detach from the high frequency band and release the AP 206. If the RLF counter is less than the RLF counter threshold, then the UE 204 then compares the RLF timer to the RLF timer threshold at 658. Additional timers or delays may also be used in this embodiment for calibration of the counter mechanism.

In other embodiments, in the steps of the methods of FIGS. 6A-6C are performed at the eNB 202, the UE 204, or the AP 206.

During any of the above described channel states, the UE 204 may fall back to LTE instead of using the high frequency AP 206. In this instance, the UE 204 reports a suspend state due to high frequency link loss or a 60 GHzLinkLoss indication, or another Link Loss indication. How the UE 204 determines whether a loss is temporary is dependent on UE implementation. The UE 204 may determine if the signal is dropped based on measured signal quality or packet decode rate. In one embodiment, there is an equivalent of Tsteering-60 GHz-suspend or Tseeting-60 GHz-fail, which controls whether RLF or a suspend state is reported by the UE. The eNB 202 may switch the traffic to LTE and a timer may start and/or a counter may be utilized (using various mechanisms to switch—both for download and upload). If a resume signal is not received before the timer expires, or if the timer is greater than a threshold, then the eNB 202 will request the UE 204 to detach from the high frequency band and release the AP connection. Alternatively, the UE 204 may also send a measurement report if alternative APs become available, or a signal is measured above a threshold. Based on the state of the suspend or RLF timer, the eNB 202 decides whether to handover the traffic to a new AP 206. The UE 204 may also suppress the measurement report if the UE is in the suspend state. If packet loss exceeds a specified threshold, the RLF or suspend indication may also come from the AP 206. Additionally, the UE may use a suspend/resume mechanism instead of declaring RLF.

According to an Example 1, an apparatus of a fifth generation (5G) or long term evolution (LTE) evolved NodeB (eNB), comprises one or more memory units configured to load and store data or instructions for operations performed by one or more circuits of the eNB, and a baseband circuit comprising one or more baseband processors. The eNB is connected to a 60 GHz access point (AP) via an Xw interface. The baseband circuit is configured to decode and execute instructions from the one or more memory units, and upon execution of the instructions is configured to encode one or more measurement events, wherein the one or more encoded measurement events are configured to instruct a user equipment (UE) to set a trigger to measure a 60 GHz access point.

According to an Example 2 based upon Example 1, the baseband circuit is configured to encode an indicator signal if the user equipment is close to the 60 GHz access point.

According to an Example 3 based upon Examples 1 or 2, the baseband circuit is configured to modulate an access point location information via either a broadcast message or dedicated signaling.

According to an Example 4 based upon Example 1, the baseband circuit is configured to encode a beamforming information.

According to an Example 5 based upon Example 1, the baseband circuit is configured to determine if the 60 GHz access point is located within a coverage area of the eNB, determine if the UE is located within the coverage area of the eNB, and selectively encode the one or more measurement events, based on the location of the UE, the location of the 60 GHz access point, and the coverage range of the eNB.

According to an Example 6 based upon any of Examples 3-5, the baseband circuit is configured to encode an indicator signal for delivery to the UE if the user equipment is within a predetermined distance of the 60 GHz access point.

According to an Example 7 based upon any of Examples 1-6, in encoding the one or more measurement events the baseband circuit is configured to modulate an access point discovery assistance information via either a broadcast message or dedicated signaling.

According to an Example 8 based upon any of Examples 1-7, the baseband circuit is configured to selectively encode a beamforming information comprising a sweep schedule that directs the UE to perform a measurement for the AP upon receipt of an AP measurement report from the UE.

According to an Example 9 based upon any of Examples 1-8, the apparatus further comprises an application circuit comprising one or more application processors configured to decode and execute instructions from the one or more memory units or an internal memory, wherein upon an establishment of a link between the AP and the UE the application circuit is configured to establish a radio link failure (RLF) timer to indicate a switch of traffic from 60 GHz to LTE only after a channel quality metric is below a threshold for a time period dictated by the RLF timer.

According to an Example 10 based upon any of Examples 1-8, the apparatus further comprises an application circuit comprising one or more application processors configured to decode and execute instructions from the one or more memory units or an internal memory. Upon an establishment of a link between the AP and the UE the application circuit is configured to establish a radio link failure (RLF) counter, wherein if a channel quality metric falls below a threshold the RLF counter is incremented by 1, and wherein if the counter exceeds a count threshold, the baseband circuit encodes a radio link failure information.

According to an Example 11 based upon any of Examples 1-8, the apparatus further comprises an application circuit comprising one or more application processors configured to decode and execute instructions from the one or more memory units or an internal memory. Upon an establishment of a link between the AP and the UE the application circuit is configured to establish a radio link failure (RLF) timer and a RLF counter, wherein when a channel quality metric falls below a threshold the RLF counter is incremented by 1, and if a count of the RLF counter does not exceed a count threshold within a predetermined time period set by the RLF timer, the RLF counter and the RLF timer are reset, and if the count threshold is exceeded within the predetermined time period, the baseband circuit encodes a radio link failure information.

According to an Example 12 based upon any of Examples 9-11, the application circuit is configured to blacklist the AP if there is a radio link failure for a specified amount of time.

According to an Example 13 based upon any of claims 1-8, an application circuit is included and is configured to establish a radio link failure (RLF) timer and a RLF counter, wherein when the RLF timer expires the RLF counter is reset.

According to an Example 14, an apparatus of a user equipment (UE), comprising a fifth generation (5G) interface to communicate with a 60 GHz access point (AP) and 5G or long term evolution (LTE) evolved NodeB (eNB) is disclosed. The apparatus comprises an application circuit comprising one or more memory units configured to load and store data or instructions for operations performed by one or more circuits, and a baseband circuit comprising one or more baseband processors. The baseband circuit is configured to decode and execute instructions from the one or more memory circuits, and upon execution of the instructions is configured to decode one or more measurement events from the eNB, set one or more trigger thresholds based on the one or more measurement events, and selectively perform a 60 GHz access point measurement based on the one or more trigger thresholds and one or more measured signals.

According to an Example 15 based upon Example 14, the baseband circuit is configured to encode a UE location information or a network measurement report when the one or more measured signals satisfy a predetermined criteria with respect to the one or more trigger thresholds.

According to Example 16 based upon Example 15, the baseband circuit is configured to encode the network measurement report with one or more neighbor cell locations.

According to Example 17 based upon Example 15, the baseband circuit is configured to encode global positioning system (GPS) information or observed time difference of arrival (OTDOA) location information.

According to Example 18 based upon any of Examples 14-17, the baseband circuit is configured to fall back to a LTE network in the event of a suspend due to a loss of the 60 GHz link.

According to Example 19 based upon any of Examples 14-18, the baseband circuit is configured to encode an AP measurement report to indicate one or more 60 GHz access points.

According to Example 20 based upon any of Examples 14-19, the baseband circuit is configured to measure a received signal strength indicator (RSSI) on either a 2.4 GHz band or a 5 GHz band and to decode 60 GHz information therefrom.

According to Example 21, and apparatus of a fifth generation (5G) or long term evolution (LTE) evolved NodeB (eNB) is disclosed. The apparatus comprises one or more memory circuits configured to load and store data or instructions for operations performed by one or more circuits, and a baseband circuit comprising one or more baseband processors. The eNB is connected to a 60 GHz access point (AP) via an Xw interface. The baseband circuit is configured to decode and execute instructions from the one or more memory circuits, and upon execution of the instructions is configured to determine if the AP is located within a coverage area of the eNB, determine if a user equipment (UE) is located within the coverage area of the eNB, selectively encode a 60 GHz discovery assistance information based on if the user equipment and the AP are located within the coverage area of the eNB. The 60 GHz discovery assistance information comprises an AP location information or a measurement configuration.

According to an Example 22 based upon Example 21 the measurement configuration comprises one or more measurement events or one or more trigger events.

According to an Example 23 based upon Examples 21 or 22, the apparatus further comprises an application circuit comprising one or more application processors configured to decode and execute instructions from the one or more memory units or an internal memory, wherein upon an establishment of a link between the AP and the UE the application circuit is configured to establish a radio link failure (RLF) timer to indicate a switch of traffic from 60 GHz to LTE only after a channel quality metric is below a threshold for a time period dictated by the RLF timer.

According to an Example 24 based upon Examples 21 or 22, the apparatus further comprises an application circuit comprising one or more application processors configured to decode and execute instructions from the one or more memory units or an internal memory, wherein upon an establishment of a link between the AP and the UE the application circuit is configured to establish a radio link failure (RLF) counter, wherein if a channel quality metric falls below a threshold the RLF counter is incremented by 1, and wherein if the counter exceeds a count threshold, the baseband circuit encodes a radio link failure information.

According to an Example 25 based upon Examples 21 or 22, the apparatus further comprises an application circuit comprising one or more application processors configured to decode and execute instructions from the one or more memory units or an internal memory, wherein upon an establishment of a link between the AP and the UE the application circuit is configured to establish a radio link failure (RLF) timer and a RLF counter, wherein when a channel quality metric falls below a threshold the RLF counter is incremented by 1, and if a count of the RLF counter does not exceed a count threshold within a predetermined time period set by the RLF timer, the RLF counter and the RLF timer are reset, and if the count threshold is exceeded within the predetermined time period, the baseband circuit encodes a radio link failure information.

According to an Example 26 based upon any of Examples 23-25, the application circuit is configured to blacklist the AP if there is a radio link failure for a specified amount of time.

According to an Example 27, an apparatus of a user equipment (UE), comprising a fifth generation (5G) interface to communicate with a 60 GHz access point (AP) and 5G or long term evolution (LTE) evolved NodeB (eNB) is disclosed. The apparatus comprises one or more memory circuits configured to load and store data or instructions for operations performed by one or more circuits, and a baseband circuit comprising one or more baseband processors. The baseband circuit is configured to decode and execute instructions from the memory, and upon execution of the instructions is configured to decode a 60 GHz discovery assistance information comprising a 60 GHz AP location information or a measurement configuration, and perform a 60 GHz measurement based on the 60 GHz discovery assistance information.

According to an Example 28 based upon Example 27, the apparatus further comprises an application circuit configured to encode a network measurement report when one or more measurement events are satisfied.

According to an Example 29 based upon Examples 27 or 28, the baseband circuit is configured to measure a received signal strength indicator (RSSI) on either a 2.4 GHz band or a 5 GHz band and to decode 60 GHz information therefrom.

According to an Example 30 an apparatus of a high frequency band or multi band access point, comprising a fifth generation (5G) interface to communicate with an evolved NodeB (eNB) and a user equipment (UE) is disclosed. The apparatus comprises an application circuit comprising one or more application processors, one or more memory circuits configured to load and store data or instructions for operations performed by the application circuit or the baseband circuit, and a baseband circuit comprising one or more baseband processors. The baseband circuit is configured to decode and execute instructions from the one or more memory circuits, and upon execution of the instructions is configured to support a triband functionality, wherein the triband functionality comprises two low band wireless local area networks (WLAN) and a high band WLAN. The baseband circuit is configured to modulate high band WLAN information via the two low band WLANs.

According to an Example 31 based upon Example 30, the baseband circuit is configured to connect to the UE and the eNB and to encode the high band WLAN information.

According to an Example 32 based upon Examples 30 or 31, the baseband circuit is configured to establish a threshold, and if a measurement of a low band of one or more of the two WLANs exceeds the threshold, a 60 GHz discovery procedure is to be performed.

According to an Example 33 based upon any of Examples 30-32 the baseband circuit is configured to encode a sweep training schedule information.

Although the invention has been illustrated and described with respect to one or more implementations, alterations and/or modifications may be made to the illustrated examples without departing from the spirit and scope of the appended claims.

One or more of the operations described can constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An apparatus of a fifth generation (5G) or long term evolution (LTE) evolved NodeB (eNB), the apparatus comprising:
    one or more memory circuits configured to load and store data or instructions for operations performed by one or more circuits of the eNB, wherein the eNB is connected to a 60 GHz access point (AP) via an Xw interface; and
    a baseband circuit comprising one or more baseband processors, wherein the baseband circuit is configured to decode and execute instructions from the one or more memory circuits, and upon execution of the instructions is configured to:
        encode one or more measurement events including beamforming information comprising a sweep schedule, wherein the one or more encoded measurement events are configured, upon receipt by a user equipment (UE), to set a trigger to measure the AP and perform a measurement for discovery of the AP upon receipt of an AP measurement report from the UE.

2. The apparatus of claim 1, wherein the baseband circuit is configured to:
    determine if the 60 GHz access point is located within a coverage area of the eNB;
    determine if the UE is located within the coverage area of the eNB; and
    selectively encode the one or more measurement events, based on the location of the UE, the location of the 60 GHz access point, and the coverage range of the eNB.

3. The apparatus of claim 1, wherein the baseband circuit is configured to encode an indicator signal for delivery to the UE if the user equipment is within a predetermined distance of the 60 GHz access point.

4. The apparatus of claim 1, wherein in encoding the one or more measurement events, the baseband circuit is configured to modulate an access point discovery assistance information via either a broadcast message or dedicated signaling.

5. The apparatus of claim 1, further comprising an application circuit comprising one or more application processors configured to decode and execute instructions from the one or more memory circuits or an internal memory, wherein upon an establishment of a link between the AP and the UE the application circuit is configured to establish a radio link failure (RLF) timer to indicate a switch of traffic from 60

GHz to LTE only after a channel quality metric is below a threshold for a time period dictated by the RLF timer.

6. The apparatus of claim 5, wherein the application circuit is configured to blacklist the AP if there is a radio link failure for a specified amount of time.

7. The apparatus of claim 1, further comprising an application circuit comprising one or more application processors configured to decode and execute instructions from the one or more memory circuits or an internal memory, wherein upon an establishment of a link between the AP and the UE the application circuit is configured to establish a radio link failure (RLF) counter, wherein if a channel quality metric falls below a threshold the RLF counter is incremented by 1, and wherein if the counter exceeds a count threshold, the baseband circuit encodes a radio link failure information.

8. The apparatus of claim 1, further comprising an application circuit comprising one or more application processors configured to decode and execute instructions from the one or more memory circuits or an internal memory, wherein upon an establishment of a link between the AP and the UE the application circuit is configured to establish a radio link failure (RLF) timer and a RLF counter, wherein when a channel quality metric falls below a threshold the RLF counter is incremented by 1, and if a count of the RLF counter does not exceed a count threshold within a predetermined time period set by the RLF timer, the RLF counter and the RLF timer are reset, and if the count threshold is exceeded within the predetermined time period, the baseband circuit encodes a radio link failure information.

9. An apparatus of a user equipment (UE), comprising a fifth generation (5G) interface to communicate with a 60 GHz access point (AP) and 5G or long term evolution (LTE) evolved NodeB (eNB), the apparatus comprising:
  one or more memory circuits configured to load and store data or instructions for operations performed by one or more circuits; and
  a baseband circuit comprising one or more baseband processors, wherein the baseband circuit is configured to decode and execute instructions from the one or more memory circuits, and upon execution of the instructions is configured to:
    decode one or more measurement events from the eNB;
    set one or more received signal strength indicator (RSSI) thresholds based on the one or more measurement events and measure a RSSI on either a 2.4 GHz band or a 5 GHz band;
    selectively perform a 60 GHz access point measurement based on a comparison of the RSSI on the 2.4 GHz band with the one or more RSSI thresholds or 5 GHz band with the one or more RSSI thresholds, to approximate a location of the AP when the comparison is above the one or more RSSI thresholds.

10. The apparatus of claim 9, wherein the baseband circuit is configured to encode a UE location information or a network measurement report when the one or more measurement events satisfy a predetermined criteria with respect to the one or more RSSI thresholds.

11. The apparatus of claim 10, wherein the baseband circuit is configured to encode the network measurement report with one or more neighbor cell locations.

12. The apparatus of claim 10, wherein the UE location information comprises global positioning system (GPS) information or observed time difference of arrival (OTDOA) location information.

13. The apparatus of claim 9, wherein the baseband circuit is configured to fall back to a LTE network in the event of a suspend due to a loss of the 60 GHz link.

14. The apparatus of claim 9, wherein the baseband circuit is configured to encode an AP measurement report to indicate one or more 60 GHz access points.

15. The apparatus of claim 9, wherein the one or more measurement events includes a sweep training schedule comprising access point beamforming information.

16. An apparatus of a fifth generation (5G) or long term evolution (LTE) evolved NodeB (eNB), the apparatus comprising:
  one or more memory circuits configured to load and store data or instructions for operations performed by one or more circuits, wherein the eNB is connected to a 60 GHz access point (AP) via an Xw interface;
  a baseband circuit comprising one or more baseband processors, wherein the baseband circuit configured to decode and execute instructions from the one or more memory circuits, and upon execution of the instructions is configured to:
    determine if the AP is located within a coverage area of the eNB;
    determine if a user equipment (UE) is located within the coverage area of the eNB;
    encode a 60 GHz discovery assistance information, based on if the user equipment and the AP are located within the coverage area of the eNB;
    wherein the 60 GHz discovery assistance information comprises an AP location information or a measurement configuration; and
  an application circuit comprising one or more application processors configured to decode and execute instructions from the one or more memory circuits or an internal memory;
    wherein upon an establishment of a link between the AP and the UE the application circuit is configured to establish a radio link failure (RLF) counter, wherein if a channel quality metric falls below a threshold the RLF counter is incremented by 1, and wherein if the counter exceeds a count threshold, the baseband circuit encodes a radio link failure information.

17. The apparatus of claim 16, wherein the measurement configuration comprises one or more measurement events or one or more trigger events.

18. The apparatus of claim 16, further comprising an application circuit comprising one or more application processors configured to decode and execute instructions from the one or more memory units or an internal memory, wherein upon an establishment of a link between the AP and the UE the application circuit is configured to establish a radio link failure (RLF) timer to indicate a switch of traffic from 60 GHz to LTE only after a channel quality metric is below a threshold for a time period dictated by the RLF timer.

19. The apparatus of claim 18, wherein the application circuit is configured to blacklist the AP if there is a radio link failure for a specified amount of time.

20. The apparatus of claim 16, further comprising an application circuit comprising one or more application processors configured to decode and execute instructions from the one or more memory units or an internal memory, wherein upon an establishment of a link between the AP and the UE the application circuit is configured to establish a radio link failure (RLF) timer and a RLF counter, wherein when a channel quality metric falls below a threshold the RLF counter is incremented by 1, and if a count of the RLF counter does not exceed a count threshold within a predetermined time period set by the RLF timer, the RLF counter and the RLF timer are reset, and if the count threshold is exceeded within the predetermined time period, the baseband circuit encodes a radio link failure information.

21. The apparatus of claim 16, wherein the baseband circuit is configured to selectively encode a beamforming information comprising a sweep schedule that directs the UE to perform a measurement for the discovery of the AP.

22. An apparatus of a user equipment (UE), comprising a fifth generation (5G) interface to communicate with a 60 GHz access point (AP) and 5G or long term evolution (LTE) evolved NodeB (eNB), the apparatus comprising:
  one or more memory circuits configured to load and store data or instructions for operations performed by one or more circuits;
  a baseband circuit comprising one or more baseband processors, wherein the baseband circuit is configured to decode and execute instructions from the one or more memory circuits, and upon execution of the instructions is configured to:
    decode a 60 GHz discovery assistance information comprising a 60 GHz AP location information including a sweep training schedule comprising access point beamforming information;
    perform a 60 GHz measurement based on the 60 GHz discovery assistance information upon receipt of an AP measurement report from the UE.

23. The apparatus of claim 22, further comprising an application circuit configured to encode a network measurement report when one or more measurement events are satisfied.

24. The apparatus of claim 23, wherein the baseband circuit is configured to fall back to a LTE network in the event of a suspend due to a loss of the 60 GHz link.

25. The apparatus of claim 22, wherein the baseband circuit is configured to measure a received signal strength indicator (RSSI) on either a 2.4 GHz band or a 5 GHz band and to decode 60 GHz information therefrom.

* * * * *